United States Patent [19]

Orain

[11] 4,269,460

[45] May 26, 1981

[54] BALL BEARING AND APPLICATIONS THEREOF

[75] Inventor: Michel A. Orain, Conflans Ste Honorine, France

[73] Assignee: Glaenzer Spicer, Poissy, France

[21] Appl. No.: 959,779

[22] Filed: Nov. 13, 1978

[30] Foreign Application Priority Data

Nov. 14, 1977 [FR] France ................. 77 34166

[51] Int. Cl.³ ........................................ F16C 19/18
[52] U.S. Cl. ........................... 308/233; 308/16; 308/174
[58] Field of Search ............ 308/174, 183, 188, 189 R, 308/190, 191, 193, 201, 16, 17, 194–196, 219, 235, 233

[56] References Cited

U.S. PATENT DOCUMENTS

| 2,553,536 | 5/1951 | Frenkel ................. 308/174 |
| 3,144,278 | 8/1964 | Pohler et al. ........... 308/189 R |
| 3,370,899 | 2/1968 | Eklund .................. 308/193 |
| 3,751,123 | 8/1973 | Parker .................. 308/188 X |
| 4,010,986 | 3/1977 | Otto .................... 308/16 |
| 4,035,043 | 7/1977 | Markley ................. 308/188 X |

FOREIGN PATENT DOCUMENTS

| 428161 | 4/1926 | Fed. Rep. of Germany ......... 308/193 |
| 1169210 | 4/1964 | Fed. Rep. of Germany ......... 308/193 |
| 507764 | 7/1920 | France ........................ 308/174 |
| 669682 | 8/1929 | France ........................ 308/201 |
| 42-2801 | 1/1967 | Japan ......................... 308/188 |
| 128219 | 9/1919 | United Kingdom ................ 308/196 |
| 121949 | 12/1919 | United Kingdom ................ 308/199 |
| 299073 | 5/1971 | U.S.S.R. ...................... 308/188 |

Primary Examiner—Harry N. Haroian
Attorney, Agent, or Firm—Wenderoth, Lind & Ponack

[57] ABSTRACT

The bearing comprises two rows of balls which circulate between two pairs of raceways. The raceways associated with each row of balls comprise two toric bearing surfaces which are substantially symmetrical with each other with respect to a plane perpendicular to the axis of rotation of the bearing. An elementary section of each of these bearing surfaces, in a plane containing the axis of the bearing, is at least substantially part-circular and has a radius slightly larger than the radius of the balls, and is substantially symmetrical with respect to a straight line parallel to the axis of the bearing and subtends a center angle exceeding about 120°. The arrangement is such that the orientation of forces of contact and the location of zones of contact between the balls and the raceways vary in accordance with the direction of application of the load to which the bearing is subjected.

18 Claims, 13 Drawing Figures

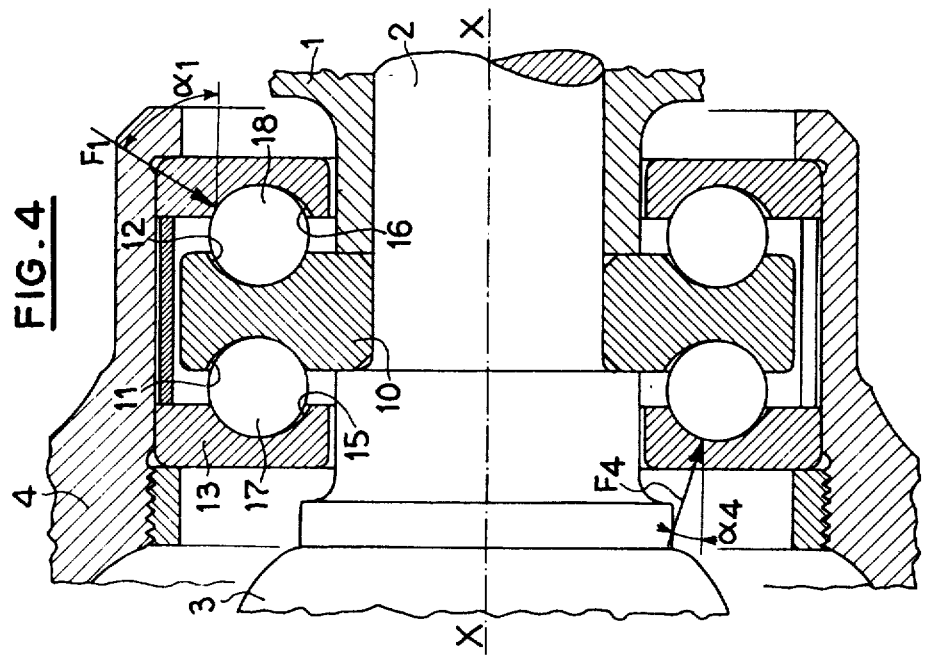
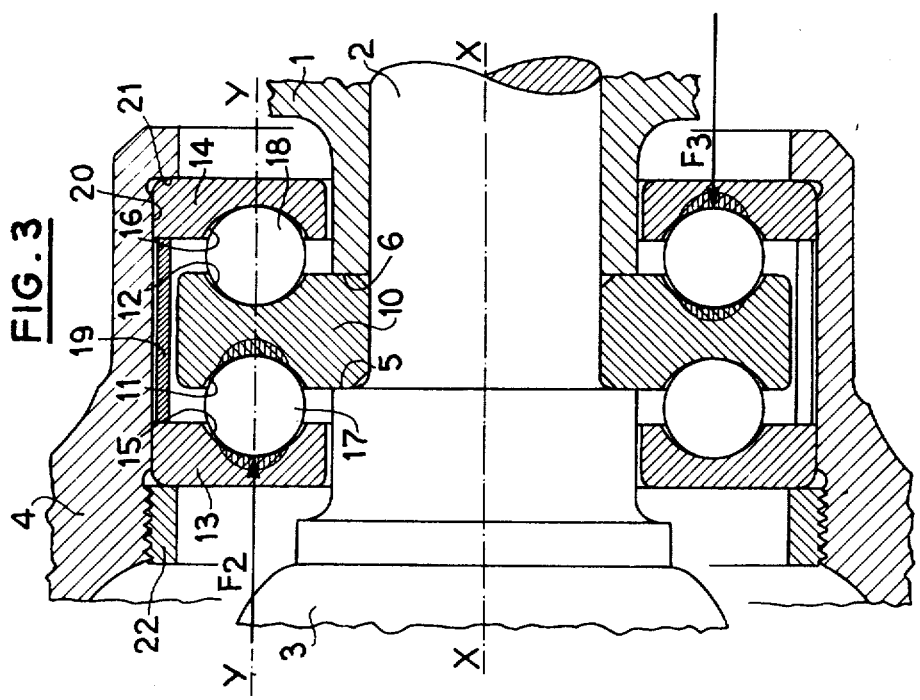

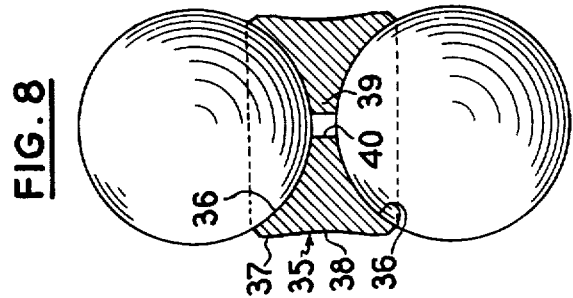
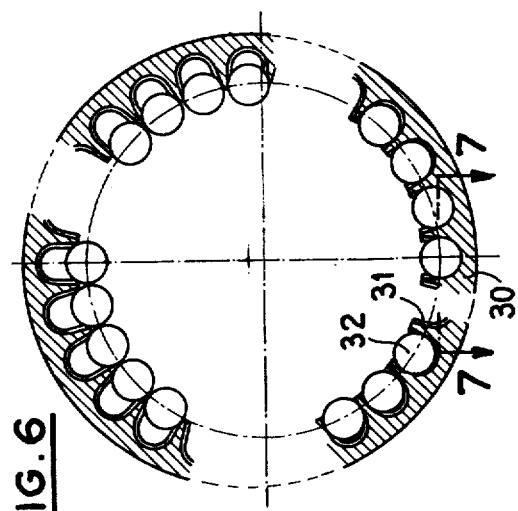
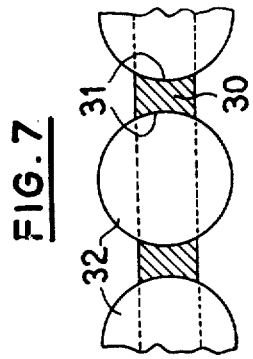
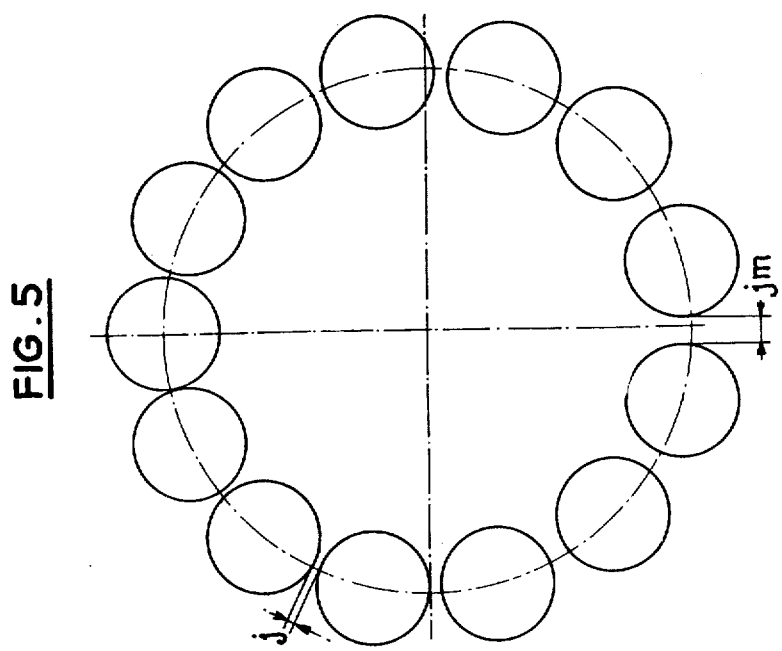

BALL BEARING AND APPLICATIONS THEREOF

DESCRIPTION

The present invention relates to rolling bearings having at least two rows of balls such as those employed in particular for mounting vehicle wheels.

It is known that, in a conventional manner, in a vehicle, each wheel is connected to the structure by a set of two ball or roller bearings which must withstand:

(1) a radial load P resulting from the weight of the vehicle and from the driving or braking forces;

(2) an axial force A resulting from lateral forces due to the inclination of the road or to centrifugal force in bends;

(3) tilting moments resulting from centrifugal force occurring in sharp road bends, and pivoting moments necessary for steering the vehicle. The tilting moment M of the axial force A relative to the axis of rotation reaches in particular a high value on the outer wheel when travelling through a bend at the limit of adherence of the tires or when a wheel strikes laterally against an edge of a pavement. The load on the balls is then four to ten times higher than that produced when the vehicle is travelling in a straight line.

In a more modern assembly, a special single rolling bearing having two rows of balls having an oblique contact, replaces the two conventional rolling bearings. Such a rolling bearing offers, relative to the prior arrangement, the advantages of reduced axial overall size, more rapid assembly and lower weight. These advantages of course significantly affect the hub of the wheel which becomes more compact, lighter and cheaper. However, these rolling bearings have a lower performance as concerns the tilting moment and their wear results roughly from 90% of the action of this tilting moment, which requires over-dimensioning these bearings and designing them to have an excessive load-carrying capacity for the radial load to which they are most of the time subjected.

There is also known, but in fields of application which are quite different, thrust rolling bearings having two rows of balls which, as is well known, can withstand high axial loads in a single direction but cannot withstand on the other hand any radial load.

The object of the invention is to provide a solution to the following problem: provide a ball bearing having at least two rows of balls which is of small overall size and yet has an improved performance as concerns the tilting moment.

According to the invention, there is provided a ball bearing capable of withstanding forces of variable direction, comprising at least two rows of balls which circulate between pairs of raceways, wherein the raceways associated with each row of balls comprise two toric bearing surfaces which are roughly symmetrical to each other relative to a plane perpendicular to the axis of the bearing, the elementary section of each of these bearing surfaces in a plane containing the axis of the bearing being at least roughly part-circular, having a radius which is slightly greater than that of the balls, and being roughly symmetrical relative to a straight line parallel to the axis of the bearing and subtending an angle at the centre which is greater than or equal to 120° and, for example, between 120° and 150°, the arrangement being such that the orientation of the forces of contact and the position of the zones of contact between the balls and the raceways vary in accordance with the direction of application of the load to which the bearing is subjected.

This arrangement imparts to the bearing according to the invention a general appearance comparable to that of a thrust ball bearing but, as will be explained hereinafter, the conditions under which it carries the load and its mode of operation are fundamentally different.

According to other features:

the bearing comprises a centre ring defining a raceway on each of its radial sides, two lateral rings disposed on each side of the centre ring and maintained spaced apart from each other and each defining a raceway on their radial side facing the centre ring, and two rows of balls disposed between the pairs of facing raceways, the lateral rings having a certain axial elasticity;

the radii of the circumferences of the centres of the torus constituting the raceways differ from one ring to the other; preferably, this radius is very slightly smaller on a fixed ring than on a rotating ring;

a cage is provided which comprises radial cavities which are radially inwardly open and in which the balls are received;

separate separating means are provided between adjacent balls.

It will be understood that the rolling bearing according to the invention may be employed in various configurations and in various assemblies, several examples of which will be described hereinafter with reference to the accompanying drawings, in which:

FIGS. 1 to 3 are diagrammatic sectional views of a rolling bearing according to the invention shown under three different conditions of operation;

FIG. 3A is a partial diagrammatic cross-sectional view of the rolling bearing in a diametral plane of the bearing and to an enlarged scale;

FIG. 4 is a view similar to FIGS. 1 to 3 and illustrating a modification;

FIG. 5 is a diagram showing the manner in which the balls are arranged;

FIG. 6 is a view of the construction and operation of a cage included in the bearing;

FIG. 7 is a sectional view taken on line VII—VII of FIG. 6;

FIG. 8 is a view of separating means placed between two adjacent walls, and

Figure 1:
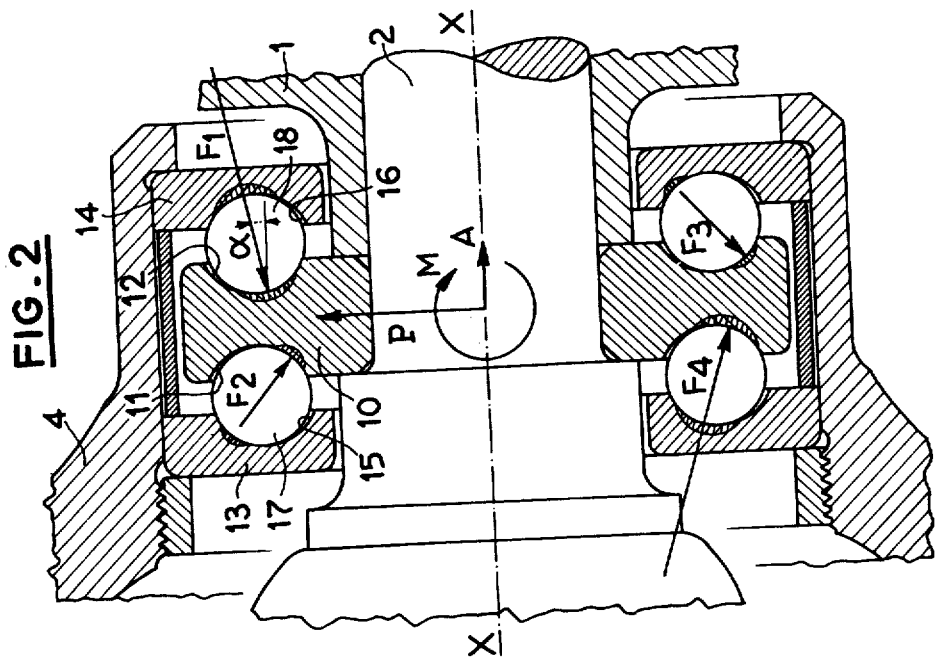

FIG. 1 shows a rolling bearing according to the invention which is interposed between two coaxial members having an axis X—X. The inner member is formed by a wheel hub 1 which is connected to rotate with a stub-axle 2 forming the end of a homokinetic joint 3. The outer member is formed by a wheel support means 4. The wheel (not shown) is in this embodiment a front driving and steering wheel and this support means 4 is in the form of a wheel pivot.

The bearing comprises a centre ring 10 defining on each of its radial sides a raceway 11, 12, and two lateral rings, 13, 14 defining, on their radial sides facing the centre ring, raceways 15, 16. Each raceway has a bearing surface which has a part-circular or roughly part-circular section which is symmetrical relative to the axis Y—Y parallel to the axis X—X. Moreover, two raceways disposed in facing relation (11,15 and 12, 16) are also roughly symmetrical relative to a plane perpendicular to the axes X—X and Y—Y. The axis Y—Y is shown in FIG. 3.

Two rows of spherical balls 17, 18 circulate between the two pairs of raceways. The radii of the sections of the raceways in a plane containing the axis X—X are slightly larger than the radii of the balls, the relationship between these radii corresponding to the conventional radii or conformity ratios, for example between 0.96 and 0.99, a ratio of 0.99 permitting higher loads but resulting in a higher rate of friction than a ratio of 0.96. In the drawings, the differences between the radii has been exaggerated in order to render the drawing more clear and enable the operation to be more clearly understood. FIG. 3A shows the bearing surfaces of the raceways 12 and 16 of the ring 10 and ring 14 as seen when the ring 10 is coaxial with the ring 14 and the dimeters of the raceways 12 and 16 are identical. The axes Y—Y of the raceways 12 and 16 are coincident. The angles $\theta^1$ and $\theta^2$ subtended at the centre by each raceway bearing surface, or central angles, in this same section is greater than, or equal to, 120° and for example between 120° and 150°, it being possible that machining difficulties require this limitation. As is clearly shown in FIG. 3A, the radii $r^1$ and $r^2$ of the bearing surfaces of raceways 12 and 16 are struck from centres lying on the axis Y—Y so that each raceway 12 and 16 is symmetrical relative to the axis Y—Y. It will be understood that the bearing surfaces of raceways 11 and 15 are arranged in the same way.

In the illustrated embodiment, the centre or median ring is centered on the bearing surface of the stub-axle 2 and it is blocked between a radial shoulder 5 of a homokinetic joint and an end face 6 of the wheel hub. It is blocked by a nut (not shown) which is screwed on the stub-axle 2.

The two lateral rings 13, 14 are spaced apart by a sleeve 19 forming a spacer member and they are disposed in a bore 20 of the wheel pivot. They are blocked against a radial abutment 21 of this pivot, for example by means of a nut 22. In this embodiment, no cage is provided, but it will be understood that the balls may be maintained spaced apart from each other by suitable means, as will be indicated hereinafter.

Figure 2:
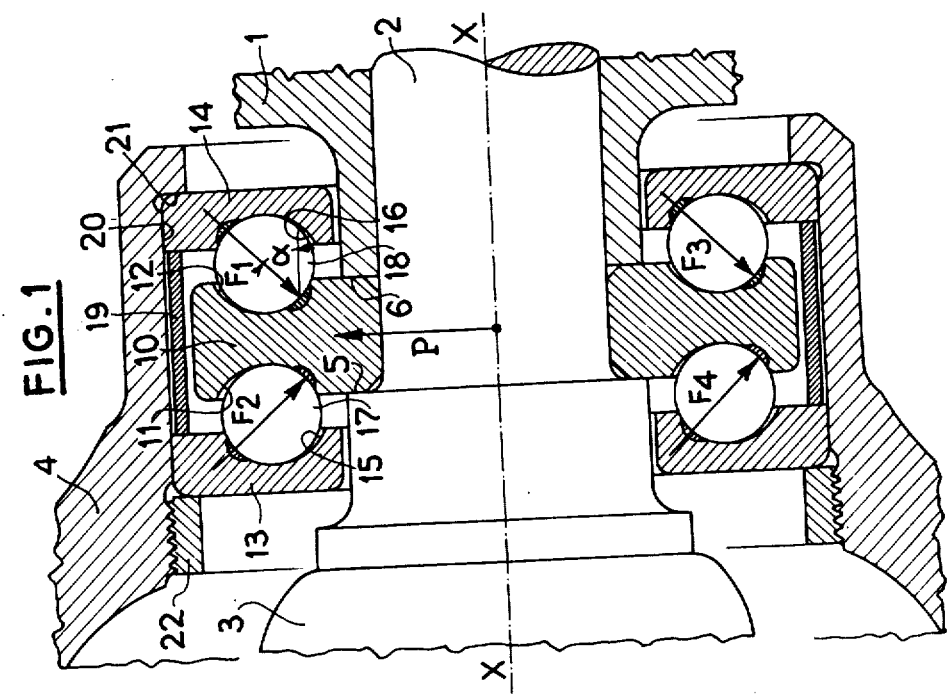

Such a bearing operates in a fundamentally different manner to that of a conventional rolling bearing or of a thrust rolling bearing. Indeed:

(a) Depending on the type and direction of application of the load that the bearing carries, the orientation of the forces and the position of the zones of contact between the balls and the raceways vary in a continuous and considerable manner as is clear from FIGS. 1 to 3 where the directions of the resultant forces are represented by arrows and the pressures of contact by cross-hatched zones which represent, on one hand, the extent of the surface of contact between the ball and the raceway and, on the other hand, the magnitude of the pressures.

In the case of FIG. 1, the load is applied radially and this results in the region of the balls in loads F1, F2, F3, F4 which are oriented at the same angle α relative to the direction of the axis of the bearing. In this case the angle α is maximum (between about 40° and 70°), so that the ellipses of contact between the balls and the raceways are located the nearest to the edges of the raceways. However, this case corresponds also to a minimum load carried by the balls so that the ellipses of contact are relatively small. Moreover, it is easy to adjust the length of the spacer member 19 so that, for a known vertical radial load, the ellipses of contact do not reach the edges of the raceways.

When a lateral force is applied to the bearing in addition to the radial load (FIG. 2), the tilting moment M creates high loads on some of the balls (arrows F1 and F4) but the centre of the corresponding ellipse of contact approaches on the other hand the axis of symmetry Y—Y of the raceways. The angle α is smaller (between about 15° and 60°) and the ellipses of contact are no longer likely to reach the edges of the raceways, nowithstanding a considerable increase in the length of their major axis.

For a pure tilting moment and ignoring the radial load, which moment may correspond for example to a lateral shock against an edge of a pavement, the situation is approximately that of the case shown in FIG. 3 in which F2 and F3 are oriented in a direction parallel to the axis of the bearing (α in the neighbourhood of 0) and in which the ellipses of contact have a maximum dimension, which is withstood without damage to the bearing since the directions of the loads are substantially directed along the axis of symmetry of the raceways and the angular extent of the latter exceeds 120°. The balls located on the other diagonal are then completely relieved of load.

(b) There are four bearing zones under radial or complex load instead of two zones in respect of the known rolling bearings having a double oblique contact.

(c) The tilting moment is withstood by the differential axial reactions of the two elementary bearings. The effective leverage opposing the tilting of the wheel is determined by the diameter of the ring of balls and no longer by their spacing, as in the known arrangements.

(d) In the ball bearing according to the invention, the lateral rings 13, 14 have a flat shape (for example a thickness of 7 mm for an outside diameter of 80 mm) and notwithstanding their high radial rigidity, they have consequently a marked axial flexibility compared to the rigidity in the region of contact between the balls and the raceways. Under axial load, they therefore react elastically and consequently the load peaks on the balls are avoided owing to a distribution of these loads over a larger number of balls, which distribution the elasticity of contact alone could not provide, mainly at the moment of high tilting moments due to, for example, lateral shocks. This phenomenon still further increases the strength of the bearing. When these peak loads disappear, no clearance is produced owing to this axial elasticity of the lateral rings and the bearing consequently continues to provide a precise guiding and silent operation.

(e) In the embodiment shown in FIGS. 1 to 3, no cage has been shown for the reason that, in this type of bearing and mainly under pure radial load, the natural speed of rotation of each ball around the general axis of the bearing is not constant. A calculation, which will not be reproduced here, permits the determination of the clearance j between two consecutive balls and there is shown diagrammatically in FIG. 5 such clearances the magnitude of which is zero for two of the balls and increases progressively until it reaches a maximum value jm in the zone which is diametrally opposed to the balls in contact. This natural separation of the balls may be sufficient to provide a silent operation. This feature distinctly distinguishes this rolling bearing from the prior art.

However, cages may be provided for avoiding any risk of contact between the balls, but it is then necessary that a sufficient clearance exist in the cavities containing the balls so as to allow the movements for the variable clearance between the adjacent balls. However, this will result in a decrease in the number of balls and it is a teaching of the invention to employ a cage such as that shown in FIGS. 6 and 7. The latter show that the cage 30 has guiding cavities 31 which are oriented roughly radially and are open at the end thereof which is the nearest to the axis of the bearing. These cavities form therebetween an angle equal to 360° divided by the number n of balls 32. This cage allows variations in the distance between the balls without however resulting an excessive clearance between the latter and the walls of the cavities.

It is also possible to provide between the balls separating means 35 which are distinct from each other. One of these means is shown in FIG. 8. It has the general shape of a part of a ring which has a diameter less than that of the raceways and is defined by two concave part-spherical bases 36 having a radius slightly larger than that of the balls. The lateral wall 37 of the ring is preferably recessed at 38 and the transverse wall 39 defined by the two bases is provided with an orifice 40. These separating means are very strong, effective and cheap. They avoid any possibility of contact and shock between the balls and contribute to the maintenance of a continuous lubricating film on the surface of the balls. They are guided by the adjacent raceways.

In the envisaged application to vehicle wheels, it may be advantageous to introduce, as manufactured, a very slight difference between the radii of the circumferences of the centres of the tores defining the raceways. These radii are then chosen to be slightly smaller on the fixed rings 13, 14 than on the rotating ring 10 so as to equalize the pressures of contact on the two zones of contact of each fixed ring and therefore reduce the maximum pressure. Indeed, this choice in the magnitude of the radii counterbalances two phenomena which increase the Hartz pressure in the lower zone of contact of the fixed ring, here the lateral ring, and which are the following:

1. The force producing the tilting moment is applied laterally below the bearing in the region of contact between the tire and the ground. It is therefore axially added to the other loads in the lower zone and subtracted from the upper zone of the bearing.
2. The circumferential curvature of the lower zone of contact is convex whereas it is concave in the upper zone of contact.

In this way, the distribution of the fatigue on the fixed ring is improved, which is advantageous since, usually, in a rolling bearing, this fixed ring has a shorter life. The value of the difference between the radii depends on the ratio of conformity adopted. It is chosen in such manner that the resulting fatigue in different cases of utilization be equal statistically in the different zones of support. In this way, the life of the bearing is prolonged and this advantage is more marked when a tilting moment is added to a vertical load.

FIG. 4 shows diagrammatically the beneficial result of such a correction. Indeed, the load F4 is markedly reduced in magnitude, the angle of pressure $\alpha_4$ being small. The major part of the vertical component of the load corresponds to F1 whose angle of pressure $\alpha_1$ is increased.

The many advantages of this rolling bearing are the following:
- the radial load is distributed over four zones of the raceways instead of two zones in the bearings of known type having a double oblique contact;
- in the case of an appreciable tilting moment, the useful leverage for absorbing this moment is substantially larger than in the rolling bearings of known type (for example twice as large);
- in the case, for example, of the lateral shock of the wheel against an edge of a pavement, the resulting overloads are well-centered and distributed on the raceways which have a width double that of the raceways of known type;
- the relative flexibility of the outer rings operating in the manner of rigid Belleville washers, permits a good distribution of the loads in the case of a large tilting moment;
- the precision of the guiding when steering and in respect of tilting of the wheel is increased since the steering and tilting moments are received by a single inner ring, whereas the double rotating inner rings of bearings have oblique contacts of known type are the centre of radial differential sliding upon lateral shock with for consequence a slight warping of the wheel;
- the simplicity of the adjustment of the pre-stressing on the balls, which is achieved by means of a spacer member when assembling the bearing, permits, without intervention on the machining dimensions of the raceways, easily and cheaply producing a perfectly rigid rolling bearing without a hard point and ensuring that the zones of contact do not reach the edges of the raceways;
- the variation in the angles of pressure in accordance with the cases of load encountered, distributes the fatigue stresses over larger zones of the raceways and contributes to a prolonged life thereof;
- the axial overall size is small and this results in an economy and increased lightness as concerns the bearing and the assembly comprising the pivot and hub of the wheel;
- it is possible to easily and cheaply produce precise blanks of the raceways by cold stamping of flat washers which are blanked from a rolled steel band;
- a natural reserve supply of lubrication is defined by the U-section of the bearing;
- it is just as adaptable to steering, driving or freely rotatable vehicle wheels and to various configurations of the forces applied thereto;
- it is easy to combine it with a device for driving and radially centering having end teeth;
- it may be mounted very tightly in a housing or on a shaft with no danger of deterioration, hard point or adverse effect on the adjustment of the pre-stressing;
- it permits the utilization, for a given load-carrying capacity, of balls of smaller diameter (7 mm instead of 11 mm for example),
- this rolling bearing has less radial rigidity than bearings of known type; in other words, under a given radial load, the radial displacement of the shaft relative to the bore containing the bearing is distinctly greater than in conventional rolling bearings. This results from the described modification of the magnitude of the angle of pressure α. As the difference between the radius of curvature of the raceways and the radius of curvature of the balls is small, the radial displacement is also very small, of around 0.1 to 0.2 mm for balls having a diameter of 7 mm, and this displacement presents absolutely no inconvenience for a vehicle wheel associated with a suspension which is very flexible in the vertical direction.

On the other hand, the effect of this low radial rigidity is beneficial from the point of view of silence of operation by the effect of the filtering of noises and radial components of the high-frequency vibrations which may be transmitted from the tire or the brakes to the body through the ball bearing.

Various examples of application of the ball bearing will now be described with reference to FIGS. 9 to 13.

Figure 9:
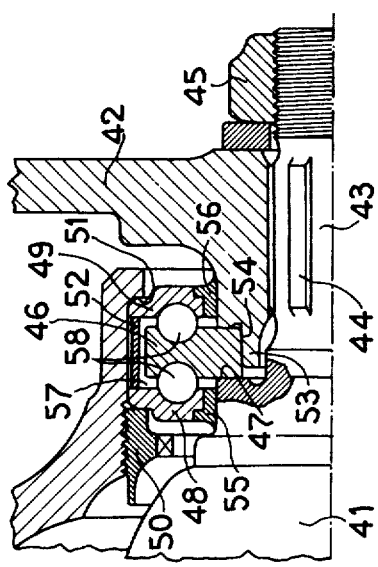

In the arrangement shown in FIG. 9, the homokinetic joint 41 drives the wheel hub 42 through the stub-axle 43 and the splines 44. The hub is fixed axially by a nut 45 in position against the centre ring 46 of the bearing and against the shoulder 47 of the homokinetic joint. The lateral rings 48 and 49 of the bearing are held by a nut 50 in position against a shoulder 51 of the wheel pivot and are separated from each other by the spacer member 52. The centering of the hub in the bearing is achieved by the fitted mounting of a flange 53 in the bore 54 of the centre ring. Rotating sealing elements 55 and 56 close the U-shaped cavity 57 which the balls 58 roll and retain therein the lubricant while affording protection against outside contamination.

Figure 10:
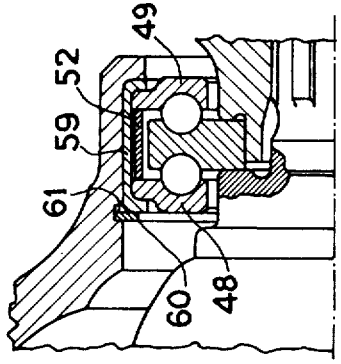

In the embodiment shown in FIG. 10, the two lateral or outer rings 48 and 59 of the rolling bearing and their spacer member 52 are centered and locked axially by a collar 59 whose ends are formed over. In this case, a ring 60 placed in a groove 61 is sufficient to retain the bearing which is rendered rigid with the pivot in accordance with a known method, that is to say under a high radial pressure.

This type of assembly has the advantage, in respect of mass-production, of not requiring the screwthread on the hub and the ring 50 (FIG. 9). On the other hand, the ring 60 (FIG. 10) cannot along prevent the tilting of the bearing with respect to its housing since it cannot exert an axial force, and it is the force fit of the bearing in the bore which has for purpose to prevent the tilting of the bearing relative to the pivot, the ring merely being a safety measure. As the bore of the hub provided for housing the bearing is machine-finished on an automatic machine and non-ground for reasons of economy, the interference fit of the bearing is rather variable and, bearing in mind that the minimum degree of interference must be sufficient to avoid, by the effect of friction, the tilting of the bearing relative to the pivot, the maximum degree of interference inevitably results in a very high radial gripping which, in the case of a known rolling bearing, dangereously increases the pre-stressing on the balls, "hardens" the rotation and reduces the service life of the bearing.

In contrast, in the bearing according to the invention, the radial mounting stress, as concerns the fitting both in the bore of the pivot or support and on the inner shaft, does not adversely affect the axial pre-adjustment of the bearing for two essential reasons:

(a) the radial gripping has practically no effect in the axial direction;

(b) the radial strength and rigidity of the rings are much higher than in the case of rolling bearings having oblique contacts of known type.

Consequently, the bearing according to the invention allows without any inconvenience assemblies which are very tight radially and therefore lends itself better than bearings of known type to this cheap assembly method.

Figure 11:
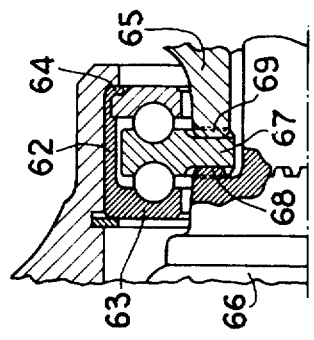
FIGS. 9 to 13 are half-sectional views of various assemblies of the bearing according to the invention.

In the embodiment shown in FIG. 11, the spacer member and the collar are replaced by a thin flange 62 carried by one of the lateral bearing rings 63. The free edge 64 of the flange 62 is softened by a suitable annealing so as to be capable of being formed over around the other lateral ring. Moreover, the wheel hub 65 is driven by the homokinetic joint 66 through the centre ring 67 of the bearing by means of two end teeth couplings, one of which, 68, is located between the homokinetic joint 66 and the ring 67, whereas the other, 69, is located between the ring 67 and the wheel hub 65. The coupling 69 also achieves the centering of the hub on the ring 67. This type of drive is described in French Pat. No. 1 586 379. It combines particularly well with the rolling bearing according to the invention to give an assembly of great simplicity and great strength. Note that the cold stamping operation for forming the end teeth may be at the same time employed for preparing blanks of the raceways of the central ring 67. This also results in very marked economy relative to the spline drive of the known type shown in FIG. 9.

Figure 12:
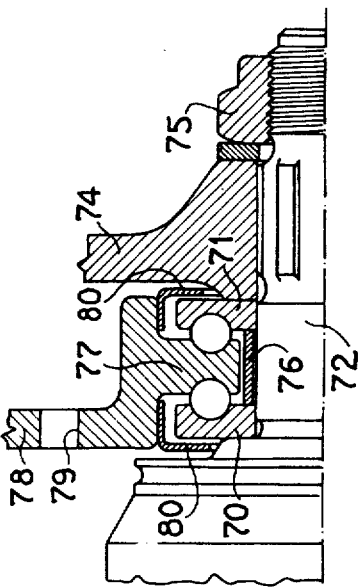

In the arrangement shown in FIG. 12, the two lateral rings 70 and 71 are centered on the stub-axle 72 which is in one piece with the homokinetic joint and are blocked axially with the wheel hub 74 by a nut 75. A spacer member 76 maintains these two rings spaced a suitable distance apart along their inner peripheries. The centre ring 77 carries on the wheel support means in the form of fixing lugs, such as 78, provided with apertures 79 for receiving fixing bolts for fixing either to the wheel pivot or directly to the suspension arm in the case of non-steering wheels. Deflectors 80 of sheet metal or plastics material form the lubricant-retaining labyrinths and may carry flexible sealing elements (not shown).

Figure 13:
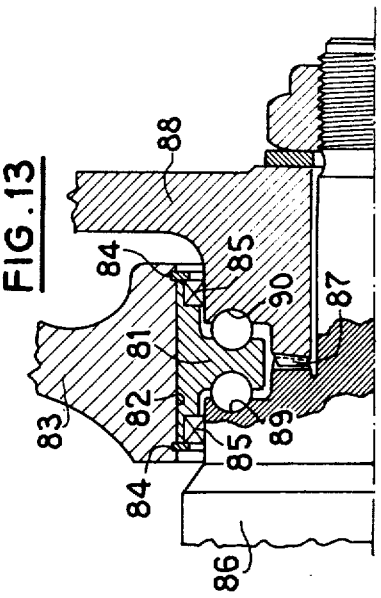

In the arrangement shown in FIG. 13, the centre ring 81 of revolution has a T-shaped cross-section and is fitted in the bore 82 of the pivot or support means 83 for the wheel where it is a press-fit and retained by two rings 84 disposed in grooves. Sealing elements 85 close the annular cavity for retaining the lubricant and affording protection of the bearing. The homokinetic joint 86 can pass through the bore 82 so as to facilitate the assembly and disassembly of the transmission shaft. A toothed coupling 87 ensures the driving of the wheel hub 88 by the homokinetic joint 86. The raceways 89 and 90 on the homokinetic joint and on the hub are ground (after being locally hardened) while being supported on the end teeth.

It will be understood that the features of the various arrangements described hereinbefore may be intercanged and combined to provide different arrangements which are also within the scope of the invention as defined in the claims.

Having now described my invention what I claim as new and desire to secure by Letters Patent is:

1. In a structure comprising a first element having an axis, a second element rotatable relative to said first element about said axis, and a radial rolling bearing assembling said first element with said second element, said bearing being capable of withstanding loads of variable direction and comprising an inner ring and two axially spaced outer rings defining with the inner ring at least two pairs of raceways, means fixing a first radial end of said inner ring to one of said elements, spacer means maintaining a predetermined axial spacing between a radial end of the outer rings opposed to said first radial end of said inner ring, clamping means urging said end of both said outer rings toward each other, retaining means axially retaining said outer rings and said spacer means relative to the other of said elements, two rows of spherical balls interposed between and rollingly engaging respective pairs of said raceways, the two raceways associated with each row of balls comprising two annular concave bearing surfaces which are substantially symmetrical with respect to a plane perpendicular to the axis of the bearing, the cross-sectional shape of each of said bearing surfaces in any diametral plane containing said axis being a single arc having a radius which is at least substantially constant and which is slightly larger than the radius of the balls and subtends a central angle of at least substantially 120°, said arc being substantially symmetrical relative to a line which intersects the centre of said radius of the arc and is normally parallel to said axis, and said cross-sectional shape resulting in a sole point of tangency between each ball and each bearing surface, and wherein substantially said entire outer rings are capable of resilient axial flexure in operation of the bearing sufficient to allow said inner ring to move radially relative to said outer rings and to allow said point to change its location without clearance on substantially the whole of the arc as the ball rolls around the bearing surface in accordance with the conditions of operation of the bearing.

2. In a structure as claimed in claim 1, wherein the central angle is between 120° and 150°.

3. In a structure as claimed in claim 1 or 2, wherein the radii of the circumferences of the annular bearing surfaces are different from one said ring to the other.

4. A rolling bearing as claimed in claim 1 or 2, further comprising a cage having radial cavities which are open radially inwardly of the bearing and in which cavities the balls are respectively received and are radially movable.

5. A rolling bearing as claimed in claim 1 or 2, further comprising separate ball-separating means between adjacent balls of said balls.

6. A structure comprising a first element comprising a vehicle wheel hub, a second element comprising wheel support means and means comprising a radial rolling bearing assembling the wheel hub with the wheel support means, the bearing having an axis of rotation and comprising a centre ring having opposite radially extending sides each of which sides defines a raceway, said centre ring being secured through one of the radial ends thereof to one of said elements, two lateral rings respectively disposed adjacent said opposite sides of the centre ring, each lateral ring defining a raceway which is associated with a corresponding raceway of said raceways defined by the sides of the centre ring to form a pair of raceways, spacer means maintaining a radial end of said lateral rings opposed to said one end of said centre ring axially spaced a predetermined distance from each other, clamping means urging said end of both lateral rings towards each other, retaining means axially retaining said lateral rings and said spacer means relative to the other of said elements, two rows of balls interposed between and rollingly engaging respective pairs of said raceways, the two raceways associated with each row of balls comprising two annular concave bearing surfaces which are substantially symmetrical with respect to a plane perpendicular to the axis of rotation of the bearing, the cross-sectional shape of each of said bearing surfaces in any diametral plane containing said axis being a single arc having a radius which is at least substantially constant and which is slightly larger than the radius of the balls and subtends a central angle of at least substantially 120°, said arc being substantially symmetrical relative to a line which intersects the centre of said radius of the arc and is normally parallel to said axis, and said cross-sectional shape resulting in a sole point of tangency between each ball and each bearing surface, and wherein substantially said entire outer rings are capable of resilient axial flexure in operation of the bearing sufficient to allow said inner ring to move radially relative to said outer rings and to allow said point to change its location without clearance on substantially the whole of the arc as the ball rolls around the bearing surface in accordance with the conditions of operation of the bearing.

7. A structure as claimed in claim 6, wherein an axle is mounted in the wheel hub and a portion of the axle and a portion of the wheel hub axially block the centre ring therebetween and couplings having end teeth couple the centre ring to said axle portion and said wheel hub portion.

8. A structure as claimed in claim 6, wherein said wheel support means define a bore, and said clamping means comprises a U-shaped member interference-fitted in said bore and maintained axially in position also by elastically yieldable ring means.

9. An assembly as claimed in claim 6, wherein an axle is mounted in the wheel hub and a spacer member acting as said axial spacing means maintains the two lateral rings separated and is disposed radially within the rows of balls, and a portion of the shaft and a portion of the wheel hub clamp the two lateral rings against the spacer member along inner peripheries of the two lateral rings, and the centre ring is connected to the wheel support means.

10. A structure as claimed in claim 6, wherein an axle is mounted in the wheel hub and at least one of the lateral rings is formed by one of two elements consisting of the wheel hub and the axle.

11. A structure as claimed in claim 10, wherein a coupling having end teeth interconnects the axle and the wheel hub.

12. In a structure comprising a first element having an axis, a second element rotatable relative to said first element about said axis, and a radial rolling bearing assembling said first element with said second element, said bearing being capable of withstanding loads of variable direction and comprising an inner ring and two axially spaced outer rings defining with the inner ring at least two pairs of raceways, means fixing a first radial end of said inner ring to one of said elements, spacer means maintaining a predetermined axial spacing between a radial end of the outer rings opposed to said first radial end of said inner ring, clamping means urging said end of both said outer rings toward each other, retaining means axially retaining said outer rings and said spacer means relative to the other of said elements, two rows of spherical balls interposed between and rollingly engaging respective pairs of said raceways, the two raceways associated with each row of balls comprising two annular concave bearing surfaces which are substantially symmetrical with respect to a plane perpendicular to the axis of the bearing, the cross-sectional shape of each of said bearing surfaces in any diametral plane containing said axis being a single arc of a circle having a radius which is slightly larger than the radius of the balls and subtends a central angle of 120°–150°, said arc being substantially symmetrical relative to a line which intersects the centre of said radius of the arc and is normally parallel to said axis, and said cross-sectional shape resulting in a sole point of tangency between each ball and each bearing surface, and wherein substantially said entire outer rings are capable of resilient axial flexure in operation of the hearing sufficient to allow said inner ring to move radially relative to said outer rings and to allow said point to change its location without clearance on substantially the whole of the arc as the ball rolls around the bearing surface in accordance with the conditions of operation of the bearing.

13. In a structure as claimed in claim 12, wherein the ratio of the radius of the balls to said radius of said arc of a circle is between 0.96 and 0.99.

14. In a radial rolling bearing rotatable about an axis and capable of withstanding loads of variable direction comprising an inner means and two axially spaced outer means defining with the inner means at least two pairs of raceways, means maintaining the axial spacing between the outer means, two rows of spherical balls interposed between and rollingly engaging respective pairs of said raceways, the two raceways associated with each row of balls comprising two annular concave bearing surfaces which are substantially symmetrical with respect to a plane perpendicular to the axis of the bearing; the improvement wherein said outer means are axially resiliently flexible in operation of the bearing and the cross-sectional shape of each of said bearing surfaces in any diametral plane containing said axis is a single arc having a radius which is at least substantially constant and which is slightly larger than the radius of the balls and subtends a central angle of at least substantially 120°, said arc being substantially symmetrical relative to a line which intersects the centre of said radius of the arc and is normally parallel to said axis, and said cross-sectional shape resulting in a sole point of tangency between each ball and each bearing surface, which point is free to change its location on the arc as the ball rolls around the bearing surface in accordance with the conditions of operation of the bearing, said inner means comprising a centre ring defining one of said raceways on each of radial sides thereof, and said two outer means comprising two lateral rings disposed on each side of said centre ring and each defining a respective one of said raceways on a radial side of the lateral ring facing the centre ring, the two rows of balls being respectively interposed between pairs of facing raceways, one of said two lateral rings comprising a flange which acts as said means maintaining the axial spacing of said two outer means and which has a free end portion defining a ledge which engages behind the other lateral ring.

15. In a radial rolling bearing rotatable about an axis and capable of withstanding loads of variable direction comprising an inner means and two axially spaced outer means defining with the inner means at least two pairs of raceways, means maintaining the axial spacing between the outer means, two rows of spherical balls interposed between and rollingly engaging respective pairs of said raceways, the two raceways associated with each row of balls comprising two annular concave bearing surfaces which are substantially symmetrical with respect to a plane perpendicular to the axis of the bearing; the improvement wherein said outer means are axially resiliently flexible in operation of the bearing and the cross-sectional shape of each of said bearing surfaces in any diametral plane containing said axis is a single arc having a radius which is at least substantially constant and which is slightly larger than the radius of the balls and subtends a central angle of between 120° and 150°, said arc being substantially symmetrical relative to a line which intersects the centre of said radius of the arc and is normally parallel to said axis, and said cross-sectional shape resulting in a sole point of tangency between each ball and each bearing surface, which point is free to change its location on the arc as the ball rolls around the bearing surface in accordance with the conditions of operation of the bearing, said inner means comprising a centre ring defining one of said raceways on each of radial sides thereof, and said two outer means comprising two lateral rings disposed on each side of said centre ring and each defining a respective one of said raceways on a radial side of the lateral ring facing the centre ring, the two rows of balls being respectively interposed betrwen pairs of facing raceways, one of said two lateral rings comprising a flange which acts as said means maintaining the axial spacing of said two outer means and which has a free end portion defining a ledge which engages behind the other lateral ring.

16. A structure comprising a vehicle wheel hub, wheel support means and means comprising a radial rolling bearing assembling the wheel hub with the wheel support means, the bearing having an axis of rotation and comprising a centre ring having opposite radially extending sides each of which defines a raceway, two lateral rings respectively disposed adjacent said opposite sides of the centre ring, each lateral ring being axially resiliently flexible and a raceway which is associated with a corresponding raceway of said raceways defined by the sides of the centre ring to form a pair of raceways, means maintaining said lateral rings axially spaced from said centre ring, two rows of balls interposed between and rollingly engaging respective pairs of said raceways, the two raceways associated with each row of balls comprising two annular concave bearing surfaces which are substantially symmetrical with respect to a plane perpendicular to the axis of the bearing, the cross-sectional shape of each of said bearing surfaces in any diametral plane containing said axis being a single arc having a radius which is at least substantially constant and which is slightly larger than the radius of the balls and subtends a central angle of at least substantially 120°, said arc being substantially symmetrical relative to a line which intersects the centre of said radius of the arc and is normally parallel to said axis, and said cross-sectional shape resulting in a sole point of tangency between each ball and each bearing surface, which point is free to change its location on the arc as the ball rolls around the bearing surface in accordance with the conditions of operation of the bearing, and wherein an axle is mounted in the wheel hub and a portion of said axle and a poirtion of said wheel hub axially block said centre ring therebetween, and couplings having end teeth couple said centre ring to said axle portion and said wheel hub portion.

17. A structure comprising a vehicle wheel hub, wheel support means and means comprising a radial rolling bearing assembling the wheel hub with the wheel support means, the bearing having an axis of rotation and comprising a centre ring having opposite radially extending sides each of which defines a raceway, two lateral rings respectively disposed adjacent said opposite sides of the centre ring, each lateral ring being axially resiliently flexible and a raceway which is associated with a corresponding raceway of said raceways defined by the sides of the centre ring to form a pair of raceways, means maintaining said lateral rings axially spaced from said centre ring, two rows of balls interposed between and rollingly engaging respective pairs of said raceways, the two raceways associated with each row of balls comprising two annular concave bearing surfaces which are substantially symmetrical with respect to a plane perpendicular to the axis of the bearing, the cross-sectional shape of each of said bearing surfaces in any diametral plane containing said axis being a single arc having a radius which is at least substantially constant and which is slightly larger than the radius of the balls and subtends a central angle of at least substantially 120°, said arc being substantially symmetrical relative to a line which intersects the centre of said radius of the arc and is normally parallel to said axis and said cross-sectional shape resulting in a sole point of tangency between each ball and each bearing surface, and wherein an axis is mounted in the wheel hub, and at least one of the lateral rings is formed by one of the two elements consisting of said wheel hub and said axle.

18. A structure as claimed in claim 17, wherein said two members are interconnected by a coupling having end teeth.

* * * * *